（12） United States Patent
Zabawskyj et al.

(10) Patent No.: US 8,131,274 B2
(45) Date of Patent: *Mar. 6, 2012

(54) METHOD AND SYSTEM FOR THE PREVENTION OF UNWANTED WIRELESS TELECOMMUNICATIONS

(75) Inventors: Bohdan Zabawskyj, Woodbridge (CA); Armin Meisl, Munich (DE); Rubens Rahim, Markham (CA)

(73) Assignee: Redknee Inc., Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/870,794

(22) Filed: Aug. 28, 2010

(65) Prior Publication Data

US 2010/0330965 A1    Dec. 30, 2010

Related U.S. Application Data

(63) Continuation of application No. 12/146,977, filed on Jun. 26, 2008, now Pat. No. 7,805,132, which is a continuation of application No. 10/704,735, filed on Nov. 12, 2003, now Pat. No. 7,409,203.

(51) Int. Cl.
*H04M 3/42* (2006.01)
(52) U.S. Cl. ............... 455/414.1; 455/412.1; 455/410; 455/411; 455/445; 455/466
(58) Field of Classification Search .......... 455/414.1, 455/412.1, 410, 411, 445, 466
See application file for complete search history.

(56) References Cited

U.S. PATENT DOCUMENTS

| 6,668,173 | B2 | 12/2003 | Greene |
| 6,768,790 | B1* | 7/2004 | Manduley et al. ......... 379/88.13 |
| 7,369,867 | B2 | 5/2008 | Zabawskyj et al. |
| 7,805,132 | B2* | 9/2010 | Zabawskyj et al. ....... 455/414.1 |

OTHER PUBLICATIONS

Zabawskyj et al.; "Method and System for the Prevention of Unwanted Wireless Telecommunications"; U.S. Appl. No. 12/146,977, filed Jun. 26, 2008.
Zabawskyj et al.; "Method and System for the Prevention of Unwanted Wireless Telecommunications"; U.S. Appl. No. 10/704,735, filed Nov. 12, 2003.

* cited by examiner

*Primary Examiner* — Nghi Ly
(74) *Attorney, Agent, or Firm* — Keating & Bennett, LLP

(57) ABSTRACT

The invention of present speaks to a method and system for the prevention of unwanted wireless telecommunications which is implemented as part of a computer program product in (preferentially) the telecommunications operator's network, which meets and/or exceeds much of current, proposed and even academically anticipated legislative (and by necessity, technical) criteria, and indeed, thereby complies with the broader body of prima facie consumer requirements associated with wireless telecommunications spam filtering. Indeed, the invention provides for a remarkably flexible and customizable advance in the art through the utilization of a progressive filtering algorithm. This algorithm offers both the subscriber and the service provider with the capability to block and/or extract potentially harmful or unsolicited SMS, MMS and other such messages on the basis of an extensive range of parameters and rules.

8 Claims, 1 Drawing Sheet

METHOD AND SYSTEM FOR THE PREVENTION OF UNWANTED WIRELESS TELECOMMUNICATIONS

PRIORITY CLAIM

The present specification is a continuation of U.S. patent application Ser. No. 12/146,977 filed Jun. 26, 2008, the contents of which are incorporated herein by reference.

TECHNICAL FIELD

The present invention relates generally to telecommunications software employed in wireless telephony; and more specifically to a fully integrated computer program product and architecture for the inhibition of unsolicited wireless telecommunications prior to their receipt by the intended party.

BACKGROUND OF THE INVENTION

Unsolicited and otherwise undesirable telephone calls, e-mails and faxes have become something of a ubiquity in today's highly prized communications age. Ironically, and almost inevitably, in advancing the art, users of wireless subscribers are now experiencing similar types of unsolicited messages and/or telecommunications at their handsets and/or mobile devices, including unsolicited SMS ('SMS spam'), MMS, and EMS, among others. Particularly prevalent in Europe (owing principally to the more mature SMS and MMS market presence and usage therewith), it remains readily apparent that the problem will soon spread quantitatively and geographically.

Elements of the prior art as U.S. Patent Application 20030083078 by Allison et al., entitled methods and systems for preventing delivery of unwanted short message service (SMS) messages, which discloses a method whereby a signaling message processing and routing node transmits and receives short message service (SMS) data packets via a communications network, and therewith includes an SMS message discrimination module that determines whether an unwanted or spam SMS message is being sent to a receiving or called party. Nonetheless said application by Allison et al., inevitably remains tied to the prevention of SMS only, and appears to be GSM/IMSI-centric, as well as constrained by reliance upon SS7/SIP signaling. Indeed, our invention of present remains unconstrained by such considerations, and indeed, applies filtering rules and paradigms to incoming messages from ESMEs (i.e. on content received via an API or via a SMPP, UCP, MMX interface), and/or to all forms of asynchronous communications including, but not limited to, SMS, MMS and EMS. Our invention additionally provides for the application of network-side filtering to a broader set of network protocols including those prescribed by the TIA (ANSI-41), and may also filter media and telecommunications, based on the current location and presence status of the subscriber, and in alternate embodiments may store unsolicited informational and marketing oriented messages ('spam') to be viewed in an off-line state.

Other teachings from the prior art include U.S. Patent Application 20030074397 by Morin et al., entitled system and method to control sending of unsolicited communications over a network, however, such art remains irrelevant to the teachings discloses in our application as Morin et al. effectively employ an intermediary agent to relay content (akin to its own messaging service).

U.S. Patent Application 20030021244 by Anderson, D., entitled methods and systems of blocking and/or disregarding data and related wireless terminals and wireless service providers, provides a means for determining whether a packet of data received at a wireless terminal is from an acceptable source (and then processed accordingly therewith). However, the paucity in the disclosure by Anderson is that it blocks packets for designated sources (i.e. IP addresses or equivalent addresses), that is, while it will allow or disallow an SMS Server, it cannot block SMS's based on a finer granularity (i.e. the actual originating address such as the External Short Message Entity (ESME) identifier or MSISDN for instance).

WIPO Patent Application (WO) 03026331 by Jaeaelinoja et al., entitled method and apparatus for processing messages, discloses a method for processing SMS or MMS messages in a gateway, comprising the steps of classifying the messages based on their certain characteristics and processing the classified messages based on certain processing code that takes the classification into account. The principal delineation between such art and that of the present seeking the protection of Letters Patent remains that Jaeaelinoja et al. focuses on filtering on the input to the SMS-C (i.e. via the SMPP or equivalent protocol). Likewise, German Patent No. 10114649 to Koehler U., entitled method for selecting consignees within telephone- or cell-phone network, requires initially comparing incoming subscriber directory numbers and/or authorized information with stored subscriber numbers, discloses a method whereby a subscriber sets a filter via a control code and a short message service, or via the internet, into the information control (SMSC) assigned to him, on the basis of his subscriber number identification or on the basis of a password, or according to the call, e-mail or WAP, which blocks incoming information already in the information control, or switches it thorough. Nonetheless, the patent seems to presume that the functionality resides in the SMS-C. Indeed, much art is directed and constrained by over-reliance on the SMS-C and its known functionality.

REFERENCES CITED

U.S. Patent Application 20030083078 May, 2003 Allison et al. 455/466
U.S. Patent Application 20030074397 April, 2003 Morin et al. 709/203
U.S. Patent Application 20030021244 January, 2003 Anderson, D. 370/329

Foreign Patent Documents

03026331 March, 2003 WIPO
10114649 October, 2002 DE

SUMMARY OF THE INVENTION

The invention has been disclosed herewith to address the overall deficiencies and/or lack of foresight demonstrated in the art, particularly when one allows for the international spotlight which has been placed on the quandary by the European Union and their Directive on Privacy and Electronic Communications (Directive 2002/58/EC). Indeed, paragraph forty (40) of the Directive's Preamble provides that "[s]afeguards should be provided for subscribers against intrusion of their privacy by unsolicited communications for direct marketing purposes in particular by means of automated calling machines, telefaxes, and e-mails, including SMS messages. These forms of unsolicited commercial communications may on the one hand be relatively easy and cheap to send and on the other may impose a burden and/or cost on the recipient. Moreover, in some cases their volume may also cause difficulties for electronic communications networks and terminal equipment. For such forms of unsolicited communications for direct marketing, it is justified to require that prior explicit consent of the recipients is obtained before such communications are addressed to them. The single market requires a harmonised approach to ensure simple, Community-wide rules for businesses and users."

While other media-rich forms of asynchronous communications are expected to supplant SMS over course of the three (3) years (e.g. MMS and PoC)—the growth in SMS messaging is expected to continue to increase over the next 12-18 months. Although a portion of this growth is expected to be spurred by increasing adoption of SMS in mature markets as well as the introduction of digital wireless communications in emerging markets—a major source of growth of SMS messaging is likely to be associated with the broadcast of unsolicited informational and marketing oriented messages ('spam'). To the extent that spam is unsolicited and not explicitly authorized, it constitutes a potential irritant to the receiving party. In particular, the steady geometric increase in SMS messages are increasingly beginning to detract from the benefits of SMS. For example, personal messages may be lost or forgotten.

Telecommunications network operators and like entities must effectively achieve a balance between promoting the generation of incremental revenues through the use of SMS-based advertising/information-al messages (while complying with existing or as yet, but likely to be, introduced Privacy and/or Electronic Communications legislation, which usually call for explicit 'opt-in' mechanisms for the delivery of such marketing and/or related promotional and/or informational material).

To this end, the invention of present speaks to a method and system for the prevention of unwanted wireless telecommunications which is implemented as part of a computer program product in (preferentially) the telecommunications operator's network, which meets and/or exceeds much of current, proposed and even academically anticipated legislative (and by necessity, technical) criteria, and indeed, thereby complies with the broader body of prima facie consumer requirements associated with wireless telecommunications spam filtering. In one embodiment of the invention, the art disclosed addresses the issues associated with effectively filtering SMS spam introduced by External Short Message Entity (ESME) sources associated with the Home Operator as well as filtering SMS spam introduced by EMSE's outside of the Home Operators control (which may be hosted in a foreign jurisdiction).

In another embodiment of the invention, as it specifically relates to SMS, the invention is designed to block Mobile Terminating (MT) messages rather than Mobile Originating (MO) ones, since the inventors in seeking to advance the art grant and hold that an architecture which filters MT messages is far more comprehensive and through than a MO filtering solution; since it filters messages leaving the SMSC and as result is not limited to SMS messages originated within the network. Indeed, if MO filtering solutions have the capability to filter both MO and ESME originated SMS messages the network provider can never be sure that all foreign incoming messages are routed through a filter.

In yet another embodiment of the invention, the art provides for a highly robust system through the implementation of a two phase filtering process where messages are intercepted via SS7 (in this illustrative instance). Whereby the first filtering process intercepts Send Routing Information for Short Messages (SRI-for-SM) on their way to the HLR and the second intercepts Mobile Terminated Forward Short Messages (MT-FSM) on route to the MSC.

This invention provides for a remarkably flexible and customizable advance in the art through the utilization of a progressive filtering algorithm. This algorithm offers both the subscriber and the service provider with the capability to block and/or extract potentially harmful or unsolicited SMS, MMS and other such messages on the basis of an extensive range of parameters and rules.

In certain aspects, the present invention can provide an open architecture method and gateway system for the prevention and/or filtration of unwanted wireless telecommunications.

Aspects of the invention can exist as part of a computer program product, comprising: a) a computer readable memory medium; and b) a computer program including the mathematic and programmatic logic required to facilitate the steps, methods and rules as such.

The method or gateway system can relate to SMS, MMS, EMS and other unwanted wireless communication means which may be found in the state of the art.

The method or gateway system can relate to asynchronous messages received via TCP/IP protocols including SMPP (Short Message Peer to Peer), UCP (Universal Computer Protocol), MMx (MM1, MM4, MM7) (associated with the provision of Multi-Media Service messages), SMTP (Simple Mail Transfer Protocol), and POP3 (Post Office Protocol).

The method or gateway system can be applied to messages received in the form of an API (Application Programming Interface) (as prescribed by the 3GPP, 3GPP2, OMA, ETSI, and Parlay).

The method or gateway system can be applied to a situation where the unwanted wireless telecommunications are filtered based on intermediating network protocols (as defined in the state of the art and amended therewith from time to time).

The filtering mechanism can be based on the or any combination of, source address, destination address, network element address, protocol id/type, data coding scheme, keyword/content search, service identifier, location or presence status of the originator and/or destination.

Aspects of the method or system can be configured to build and/or request a subscriber profile from its internally articulated memory or through an external entity equipped to provide the same.

The profile can be matched against the parameters of the filtering mechanism (as particularly articulated).

A message process according to the method or system is either rejected (blocked), copied for later viewing, or routed to the subscriber as per the mechanisms documented in the state of the art.

The method or gateway system can be specifically applied to provide for the filtering of unsolicited wireless telecommunications as they relate to roaming traffic.

An SS7 monitoring subsystem can be provided to the method or gateway system to monitor and intermediate traffic associated with roaming subscribers, and, wherein, the messaging intermediation node of the invention would typically be located so as to intermediate traffic on SS7 links.

Such an intermediation node can be configured to examine certain address (and other) fields within the telecommunication and direct the relevant initiating network element (as SMSC for instance) to direct the actual telecommunication to the invention's filtering logic.

Such telecommunication can be processed and matched against the parameters of the filtering mechanism (as particularly articulated).

The message can be either rejected (blocked), copied for later viewing, or routed to the subscriber as per the mechanisms documented in the state of the art.

The method or gateway system's filtering logic can be configured so that it shall redirect subsequent relevant messaging communication traffic to the invention.

The method or gateway system can specifically relate to and provide for filtering unsolicited Mobile Terminated (MT) SMS as messages leave the SMSC so as to not limit the application of the art to SMS messages which may have originated within the network and to further ensure that all foreign incoming messages are routed through articulated filter of the computer program product which implements the rules relating to such.

The method or gateway system can be implemented as part of a multi-phase filtering process where messages are intercepted via SS7.

The method or gateway system can be configured to intercept the routing information for Short Messages (SM) on their way to the Home Location Register (HLR).

The method or gateway system can be configured to intercept Mobile Terminated Forward Short Messages (MT-FSM) on route to the MSC.

The method or gateway system can be configured so that such telecommunication is processed and matched against the parameters of the filtering mechanism (as particularly articulated).

The message can be either rejected (blocked), copied for later viewing, or routed to the subscriber as per the mechanisms documented in the state of the art.

Another aspect of the invention provides an algorithm articulated with the capability to block and/or extract potentially harmful or unsolicited wireless telecommunications messages on the basis of an extensive range of parameters and rules, including the origin of the network element address (as the SMSC), the destination and/or source address of the message, the data coding scheme used in the message (as binary, hexadecimal, ascii, and so on), content or keywords within the message, the protocol or type of message (as text, multimedia, executable file, and so on), the location and/or status of the originator, destination address, the service identifier (i.e. the service type field), number of messages sent to a source address, number of messages sent from a source address, number of recipients of one message, frequency of a message sent to a destination address, and frequency of a message sent from a destination address.

DETAILED DESCRIPTION OF THE EMBODIMENTS

Figure 1:
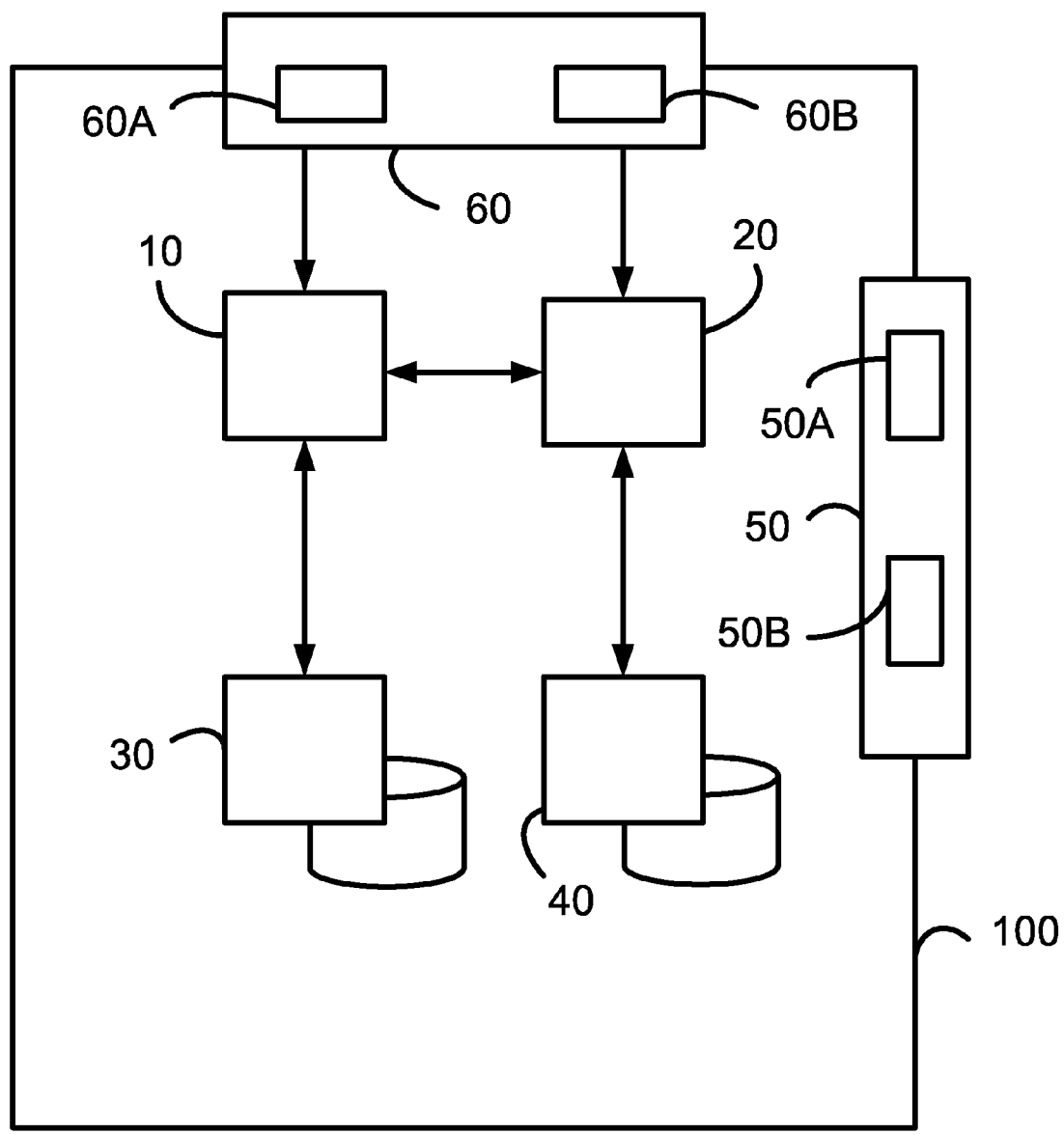
FIG. 1 illustrates a typical, non-limiting embodiment of the system level architecture employed in the disclosure of present.

Members skilled in the art will recognize that the ensuing represents an illustrative recital of the preferred embodiments of the invention of present and other embodiments may be articulated, gleaned and articulated from such while still remaining within its spirit and scope. Indeed, equivalents found within the state of the art, and those which may reasonably and effectively be deemed equivalent in the future should also be understood as being incorporated by reference hereto and such. Furthermore, much of the language has been illustrative and is to be construed as expressly for pedagogical purposes in helping elucidate the art as concisely and beneficially as practical.

The invention discloses a method and system of filtering unsolicited informational and marketing oriented messages ('spam') based on inputs into the Network Operator's network including, but not limited to, asynchronous messages received via TCP/IP protocols including SMPP (Short Message Peer to Peer), UCP (Universal Computer Protocol), MMx (MM1, MM4, MM7) (associated with the provision of Multi-Media Service messages), SMTP (Simple Mail Transfer Protocol), and POP3 (Post Office Protocol). Furthermore, this method and system of filtering spam (as defined above) messages can be applied to messages received in the form of an API (Application Programming Interface) such as those generally prescribed by the 3GPP, 3GPP2, OMA, ETSI, and Parlay.

In the preferred embodiment, the spam is filtered based on intermediating network protocols including, but not limited to, SS7 based SMS protocols such as those prescribed by GSM 03.40 and EIA/TIS IS-841 (as amended from time to time) and SIP based protocols such as those prescribed by the SIMPLE (SIP for Instant Messaging and Presence Leveraging Extensions) protocol defined by the IETF (as amended from time to time). In the case of SS7 based SMS protocols, the invention will specifically intermediate and filter messages such as MO_Forward_Short_Messages (GSM) and SMDPP (ANSI-41) messages prior to forwarding the message to the SMSC (Short Message Service Center) (which will deliver the message per existing methods and protocols as described in the state of the art).

In the preferred embodiments, the filtering mechanism is based on the (or any combination of), source address, destination address, network element address (e.g. SMSC Address), protocol id/type, data coding scheme, keyword/content search, service identifier (e.g. the service type field provided in a Submit_SM message to a SMSC), location or presence status of the originator and/or destination. With respect to location, the invention will either interface with a location element (e.g. GMLC (GSM) or MPC (ANSI-41)) or directly determine the location of the subscriber(s) based on methods and protocols as described in the art (e.g. GSM 03.71)).

One embodiment of the invention provides the logic necessary for the filtering of spam for roaming SMS traffic. A SS7 monitoring subsystem monitors and intermediates traffic associated with roaming subscribers, wherein, the messaging intermediation node would typically be located so as to intermediate traffic on inter-network SS7 links. The messaging intermediation node will specifically intercept SRI_for_SM (GSM) or SMSREQ (IS-41) messages. And upon intercepting the SRI_for_SM/SMSREQ message, the messaging intermediation node will initiate a response to the originating node (typically a SMS-C) so as to direct the actual SMS message to the SMS filtering subsystem which may be hosted by messaging intermediation node. The network element in the foreign network (the SMSC in this instance) will direct the SMS message to the SMS filtering subsystem via a MT_Forward_Short_Message (GSM) or SMDPP (Shot Message Delivery Point to Point) (ANSI-41) message. The SMS filtering subsystem will determine whether the message constitutes "spam" and will invoke the appropriate action (delete, store for later viewing, notify the originating node of a failure or successful delivery (i.e. to prevent resubmissions) and so forth. Should the SMS message be considered a valid message, the messaging intermediation node may either deliver the message directly (in which case the messaging intermediation node will request the location of the serving network element from the subscribers HLR (Home Location Register) (i.e. via a SRI_for_SM (GSM) or SMSREQ (IS-41) message), and in turn, the messaging intermediation node will initiate an attempt to deliver the SMS message to the serving node via the appropriate message (MT_FSM (GSM) or SMDPP (ANSI-41)); or provide the message to the SMSC via the applicable interface (e.g. SMPP) in order to leverage the store and forward mechanisms which are described in the state of the art. (In a rather sui generis, hybrid scenario, an unsuccessful attempt to initially deliver the message as per the former, may be forwarded to the subscriber's SMSC for delivery via latter of the scenarios outlined in the previous sentence).

Indeed, the actual elements and ranges of parameters are configurable by either the subscriber or network operator via well documented mechanisms such as web-based GUIs and bulk-loading of parametric attributes.

In alternate embodiments, such filtered content will optionally be stored for later retrieval or viewing by the subscriber or network operator. In yet another embodiment, an e-mail can be generated and forwarded to the subscriber on a (configurable) periodic basis which provides statistics as well as content (messages) which were filtered using the current settings.

Although implemented as part of a computer program product, FIG. 1 has been included to further elucidate and enable the invention disclosed herewith. Indeed, members skilled in the art will recognize that much of the functionality depicted in said FIGURE remains conceptual and 'high-level' in light of the nature of computer program products and their functionality and functional processes. For illustrative purposes the invention may be articulated with four (4) interfaces (50 and 60) (two (2) incoming 60A 60B, and two (2) outgoing 50A 50B). Incoming interfaces in this illustrative embodiment include the SMS Spam-Filter HLR. Interface 60A and the SMS Spam-Filter MT-MSC Interface 60B. Whereas the outgoing interfaces in this illustrative embodiment include the UPS Interface 50A (to retrieve the subscriber barring plan) and External spam filter API 50B.

The spam-filter HLR logic 10 has been articulated, in this illustration, to deal with unsolicited informational and marketing oriented SMS messages. At 10, the invention processes the incoming SRI-for-SM and checks if the SMSC address has not been barred in the SMSC database list 30. If barred, said request is rejected, if not, the SRI-for-SM is forwarded to the HLR (not shown). The system, referred to herein as invention 100, then checks if the said subscriber is already in the subscriber cache 40. If so then the invention 100, requests 50B the spam profile from the external spamming filter software. If not, the invention 100, then requests 50A the barring profile from the UPS.

The invention 100 then receives the SRI-for-SM response from the HLR (not shown) and forwards the SRI-for-SM to the foreign SMSC after all profiles are received. After which, said barring information is stored in the subscriber cache 40.

In relation to the SMS (in this instance) Spam-Filter MT-MSC Logic 20, the invention 100 processes the incoming MT-FSM and requests the subscriber barring profiles from subscriber cache 40. The invention 100 therewith compares the messages in question with the spamming profiles and continues when no spamming profile has been matched, or otherwise the message is rejected. The message is then forwarded to the destination MSC (Mobile Switching Center), wherewith the MT-FSM response is thereby received from destination MSC and the message is forwarded to the originated SMSC (all not shown as already well document in the state of the art).

We claim:

1. A method for filtration of unwanted wireless telecommunications comprising:

monitoring mobile multimedia service (MMS) message traffic associated with roaming subscribers received from a mobile multimedia service-center (MMS-C) in a network that is distinct from the terminating network, said traffic carried via inter-network links;

determining whether said MMS message traffic constitutes a wanted or unwanted message, wherein whether said MMS message traffic constitutes an unwanted message is based on one or more of a source address, a destination address, a network element address, a protocol id/type, a data coding scheme, a keyword/content search, a service identifier, a location of an originator and/or a destination; and invoking an action for managing said MMS traffic based on results of said determining, wherein when said MMS message traffic is determined to constitute a wanted message, then performing the additional step of providing said MMS message traffic to the MMS-C in the terminating network via an applicable interface, and wherein when said MMS message traffic is determined to constitute an unwanted message then said action comprises delete, store for later viewing, and notify said MMS-C of a failure or successful delivery.

2. The method of claim 1 wherein said location is determined based on a location element, said location element being at least one of a gateway mobile location center (GMLC) or a mobile positioning center (MPC).

3. The method of claim 1 wherein when said MMS message is determined to constitute a wanted message then performing the additional steps of: delivering said MMS message directly to an intended destination for said MMS message.

4. The method of claim 3 wherein said action comprises notification of said mobile multimedia service-center (MMS-C) of successful delivery in order to prevent resubmission of said MMS message.

5. A system for filtration of unwanted wireless telecommunications comprising:

an incoming interface for monitoring mobile multimedia service (MMS) message traffic associated with roaming subscribers received from a mobile multimedia service-center (MMS-C) in a network that is distinct from the terminating network, said incoming interface configured to receive said traffic via inter-network links;

a filter for determining whether said MMS message traffic constitutes a wanted or unwanted message, wherein whether said MMS message traffic constitutes an unwanted message is based on one or more of a source address, a destination address, a network element address, a protocol id/type, a data coding scheme, a keyword/content search, a service identifier, a location of an originator and/or a destination; and an outgoing interface for invoking an action for managing said MMS traffic based on results of said determining by said filter, wherein when said MMS message traffic is determined to constitute a wanted message, then performing the additional step of providing said MMS message traffic to the MMS-C in the terminating network via an applicable interface, and wherein when said MMS message traffic is determined to constitute an unwanted message then said action comprises delete, store for later viewing, and notify said MMS-C of a failure or successful delivery.

6. The system of claim 5 wherein said location is determined based on a location element, said location element being at least one of a gateway mobile location center (GMLC) or a mobile positioning center (MPC).

7. The system of claim 5 wherein said action comprises notification of said mobile multimedia service-center (MMS-C) of successful delivery in order to prevent resubmission of said MMS message.

8. A non-transitory computer program product comprising programming instructions executable for implementing a method, the method comprising:

monitoring mobile multimedia service (MMS) message traffic associated with roaming subscribers received from mobile multimedia service-center (MMS-C) in a network that is distinct from the terminating network, said traffic carried via inter-network links;

determining whether said MMS message traffic constitutes a wanted or unwanted message, wherein whether said MMS message traffic constitutes an unwanted message is based on one or more of a source address, a destination address, a network element address, a protocol id/type, a data coding scheme, a keyword/content search, a service identifier, a location of an originator and/or a destination; and invoking an action for managing said MMS traffic based on results of said determining, wherein when said MMS message traffic is determined to constitute a wanted message, then performing the additional step of providing said MMS message traffic to the MMS-C in the terminating network via an applicable interface, and wherein when said MMS message traffic is determined to constitute an unwanted message then said action comprises delete, store for later viewing, and notify said MMS-C of a failure or successful delivery.

\* \* \* \* \*